United States Patent [19]
Yagi

[11] Patent Number: 5,372,237
[45] Date of Patent: Dec. 13, 1994

[54] CONTROL SYSTEM FOR PARTS FEEDER
[75] Inventor: Susumu Yagi, Toyama, Japan
[73] Assignee: Yoshida Kogyo K.K., Tokyo, Japan
[21] Appl. No.: 109,258
[22] Filed: Aug. 20, 1993
[30] Foreign Application Priority Data
  Aug. 24, 1992 [JP] Japan .................. 4-248762
[51] Int. Cl.⁵ .............................. B65G 43/00
[52] U.S. Cl. .......................... 198/444; 198/751
[58] Field of Search ............ 198/391, 444, 524, 751
[56] References Cited
U.S. PATENT DOCUMENTS

| | | | |
|---|---|---|---|
| 4,382,527 | 5/1983 | Lerner | 198/751 |
| 4,394,896 | 7/1992 | McComas et al. | 198/341 |
| 4,456,822 | 6/1984 | Rose et al. | 198/751 X |
| 5,083,654 | 1/1992 | Nakajima et al. | 198/444 |

FOREIGN PATENT DOCUMENTS

| | | |
|---|---|---|
| 57-27808 | 2/1982 | Japan . |
| 59-68715 | 5/1984 | Japan . |
| 61-162471 | 7/1986 | Japan . |
| 63-258311 | 10/1988 | Japan . |
| 2-231305 | 9/1990 | Japan . |
| 3-56312 | 3/1991 | Japan . |
| 2065388 | 6/1981 | United Kingdom . |
| 2111724 | 7/1983 | United Kingdom . |
| 2182625 | 5/1987 | United Kingdom . |

Primary Examiner—Cheryl L. Gastineau
Attorney, Agent, or Firm—Hill, Steadman & Simpson

[57] ABSTRACT

A system controls the feed rate of parts delivered by a parts feeder having a vibrating unit to be vibrated with a predetermined amplitude for delivering parts and a driving unit for driving the vibrating unit. The control system has a parts detector for detecting parts delivered by the vibrating unit. A power transistor bridge supplies an alternating driving electric current to the driving unit. A driving voltage controlling circuit applies a predetermined direct current voltage to the power transistor bridge. A power transistor base driving circuit causes the power transistor bridge to function at a predetermined driving frequency. A central processing unit measures the supply rate of parts based on a signal transmitted by the parts detector and transmits a signal for regulating the driving voltage to the driving voltage controlling circuit and a signal for regulating the driving frequency to the power transistor base driving circuit in response to the supply rate of parts.

25 Claims, 5 Drawing Sheets

CONTROL SYSTEM FOR PARTS FEEDER

BACKGROUND OF THE INVENTION

1. Field of the Invention

This invention relates to a control system for a parts feeder, and more particularly to a system for controlling the feed rate of parts delivered by the parts feeder which feeds various kinds of parts to an assembling machine or the like by vibrating tile parts at a predetermined frequency.

2. Description of the Prior Art

Heretofore, various kinds of vibrating type parts feeders are known in the art. For example, published Japanese Utility Model Application, KOKAI (Early Publication) No. SHO 59-68715 discloses a parts feeder which comprises a bowl provided with a side wall having a spiral passage formed on the inner peripheral surface thereof in the form of a gently upwardly sloping surface and an electromagnet disposed beneath the bowl, the bowl being adapted to accommodate a large number of parts, the arrangement being made such that then the bowl is vibrated by the action of the electromagnet, the parts within the bowl are transferred along the passage and delivered in turn while they are being vibrated by the vibration of the bowl.

As for the system for controlling the driving of such a parts feeder, for example, published Japanese Patent Application, KOKAI No. SHO 57-27808 proposes a system wherein a light projector and a receptor of a photoelectric conversion device are disposed on a straight line so as to pass light beams through the clearance between a fixed core of an electromagnet disposed beneath the bowl and a movable core fixedly secured to the bowl, the arrangement being made such that the change in the amount of light passing through the above-mentioned clearance due to changes in the amplitude of vibration of the movable core is converted into a value of electric current to detect the amplitude of vibration of the bowl, and the amplitude of vibration of the bowl thus obtained is fed back to an amplitude controlling circuit so as to control an electric current supplied to the electromagnet for driving the bowl, thereby driving the bowl always with a predetermined amplitude. Further, there has so far been used a parts feeder provided with a photoelectric switch attached to a parts delivery chute disposed on the side of outlet for tile parts so that the photoelectric switch may detect whether the parts delivered by a bowl are overstocked in the chute or not.

In the above-mentioned conventional control system, since the object to be controlled is the bowl for delivering the parts by vibrating them and the feed rate of the parts is not grasped and controlled, there is a problem in that changes in the feed rate of parts occurs depending on the amount of the parts accommodated in the bowl. That is to say, even if the vibration of the bowl is controlled to a prescribed amplitude, the feed rate of the parts changes because the proper value of the amplitude for ensuring a desired feed rate varies with the number of the parts accommodated in the bowl. In addition, since the actual feed rate of the parts is unknown, if the consumption of the parts by the assembling machine is out of balance to the supply of the parts by the parts feeder at the time of initial setting, shortage in supply of the parts to the assembling machine takes place even if the amplitude of vibration of the bowl is kept constant. Further, another problem is that since the proper value of amplitude differs with every parts feeder, in case the parts feeder is replaced with a new one, the vibration of the bowl must be reset to a proper amplitude to ensure a desired feed rate of the parts.

SUMMARY OF THE INVENTION

Accordingly, it is a general object of the present invention to provide a parts feeder capable of delivering the accurately controlled amount of parts by a simple construction.

Another object of the present invention is to provide a control system for a parts feeder, which enables the feed rate of parts to be maintained at a proper value without the need for stopping the assembling machine due to shortage in supply of parts thereto and which enables stable assembly operation to be conducted so that the production efficiency can be improved markedly.

To achieve the above-mentioned objects, according to the present invention, there is provided an improved system for controlling the feed rate of parts delivered by a parts feeder which comprises a vibrating unit adapted to be vibrated with a predetermined amplitude for delivering parts and a driving unit for driving the vibrating unit. The control system comprises drive controlling means for controlling the above-mentioned driving unit, parts detecting means for detecting the parts delivered by the above-mentioned vibrating unit, and means controlling the feed rate of parts adapted to measure the rate of supply of the parts detected by the parts detecting means and cause the drive controlling means to adjust the driving power the above-mentioned driving unit in response to the rate of supply of the parts.

In one preferred embodiment of the invention, the parts detecting means comprises a light emitting element provided on the way of the passage of the parts to be delivered by the parts feeder and adapted to emit light to the passage of parts, and a photoelectric conversion element adapted to receive the light emitted by the light emitting element. And, the means for controlling the feed rate of parts comprises a central processing unit (CPU) which measures the rate of supply of the parts based on a signal transmitted by the parts detecting means and transmits at least one signal selected from among a signal for regulating the driving voltage and a signal for regulating the driving frequency to the drive controlling means in response to the rate of supply of the parts. The CPU transmits a drive stopping signal to the drive controlling means when the CPU has received a signal indicative of oversupply of the parts from the parts detecting means. Preferably, the driving unit comprises an electromagnet located beneath tile vibrating unit and a power transistor bridge for exciting the electromagnet, and the drive controlling means comprises a driving voltage controlling circuit for applying a predetermined direct current voltage to the power transistor bridge and a power transistor base driving circuit for causing the power transistor bridge to function at a predetermined driving frequency. The output driving voltage the driving voltage controlling circuit is lowered to a digital signal level by an attenuator and transmitted to the CPU.

The control system for the parts feeder according to the present invention is arranged such that the rate of supply of the parts delivered by the vibrating unit of the parts feeder can be grasped by the parts detecting means and the means for controlling the feed rate of parts, and the driving unit of the parts feeder is controlled according to the rate of supply of the parts so that the necessary supply rate of the parts can be set taking the parts consumption rate of an assembling machine, etc. into consideration. Therefore, this control system for the parts feeder renders it possible to ensure stable supply of the required and sufficient amounts of parts to the assembling machine, etc. during operation of the parts feeder.

BRIEF DESCRIPTION OF THE DRAWINGS

Other objects, features, and advantages of the invention will become apparent from the following description taken together with the drawings, in which.

DETAILED DESCRIPTION OF THE PREFERRED EMBODIMENTS

Figure 1:
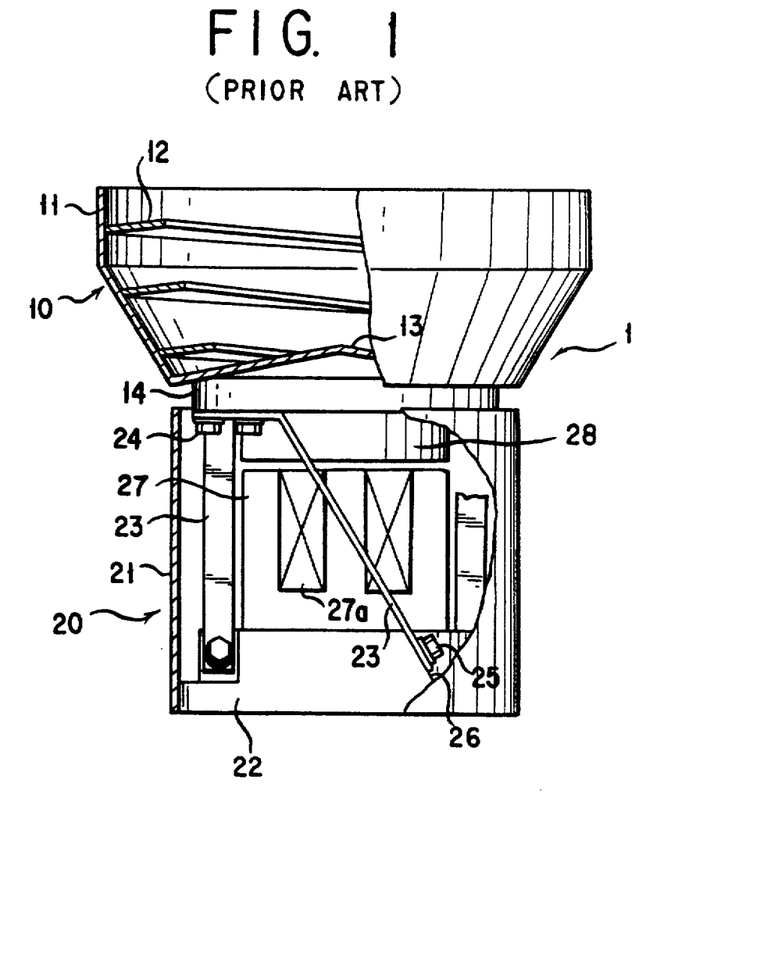
FIG. 1 is a partially cutaway side elevational view of prior art representative of a vibrating type parts feeder.

Referring to the drawings, FIG. 1 shows an example of a conventional vibrating type parts feeder to which the present invention is applicable. In FIG. 1, the parts feeder 1 comprises a bowl 10 provided with a side wall 11 having a spiral passage 12 formed on the inner peripheral surface thereof in the form of a gently upwardly sloping surface. The bowl 10 has a conical bottom plate 13 formed in the shape of a gently sloping surface. The arrangement is made such that parts (not shown) accommodated in the bowl 10 may drop along the conical sloping surface of the bottom plate 13 and collect in the lower end of the passage 12. Further, the parts feeder 1 has a driving unit 20 for vibrating the bowl 10, which is composed of an electromagnet 27 mounted on a base 22 fixed to the bottom of a housing 21. The numeral 27a indicates a coil of the electromagnet 27. A disc 14 on which the above-mentioned bowl 10 is installed is connected with the base 22 by means of circumferentially inclined plate springs 23 disposed around the electromagnet 27 at a plurality of places (four places in the example shown in FIG. 1). Stating in brief, a bent upper end portion of each of the plate springs 23 is fixedly secured to the disc 14 by means of screws 24, whilst the lower end portion thereof is fixedly secured to a slope 26 formed on the base 22 by means of a screw 25. A movable core 28 of the electromagnet 27 is fixedly secured to the lower surface of the disc 14. Accordingly, when the electromagnet 27 installed on the base 22 is rendered on and off, the movable core 28 and the disc 14 of the bowl 10 fixedly secured thereto are attracted by the electromagnet 27 against the resiliency of the plate springs 23 and moved away from the electromagnet 27 by the resilient force of the latter. However, because the plate springs 23 are inclined relative to the circumferential direction, when the electromagnet 27 is rendered on and off, the disc 14 and the bowl 10 fixedly secured thereto are subjected to combined vertical motion and reciprocal twisting motion which are repeated periodically, so that the parts in the bowl 10 are subjected to a circumferential delivery force and transferred to the upper part of the passage 12 while they are allowed to jump up and down. In the above-mentioned parts feeder 1, the bowl 10 constitutes a vibrating unit adapted to deliver the parts by its vibratory motion.

Parts feeders like the above-mentioned one are well known and disclosed, for example, in published Japanese Utility Model Application, KOKAI No. SHO 59-68715 and published Japanese Patent Application, KOKAI No. SHO 61-162471, etc. Further, it is taught in published Japanese Patent Application, KOKAI No. SHO 63-258311 to use piezoelectric elements in place of the above-mentioned electromagnet. The present invention is applicable to such parts feeders as well as commercially available various kinds of parts feeders.

Figure 2:
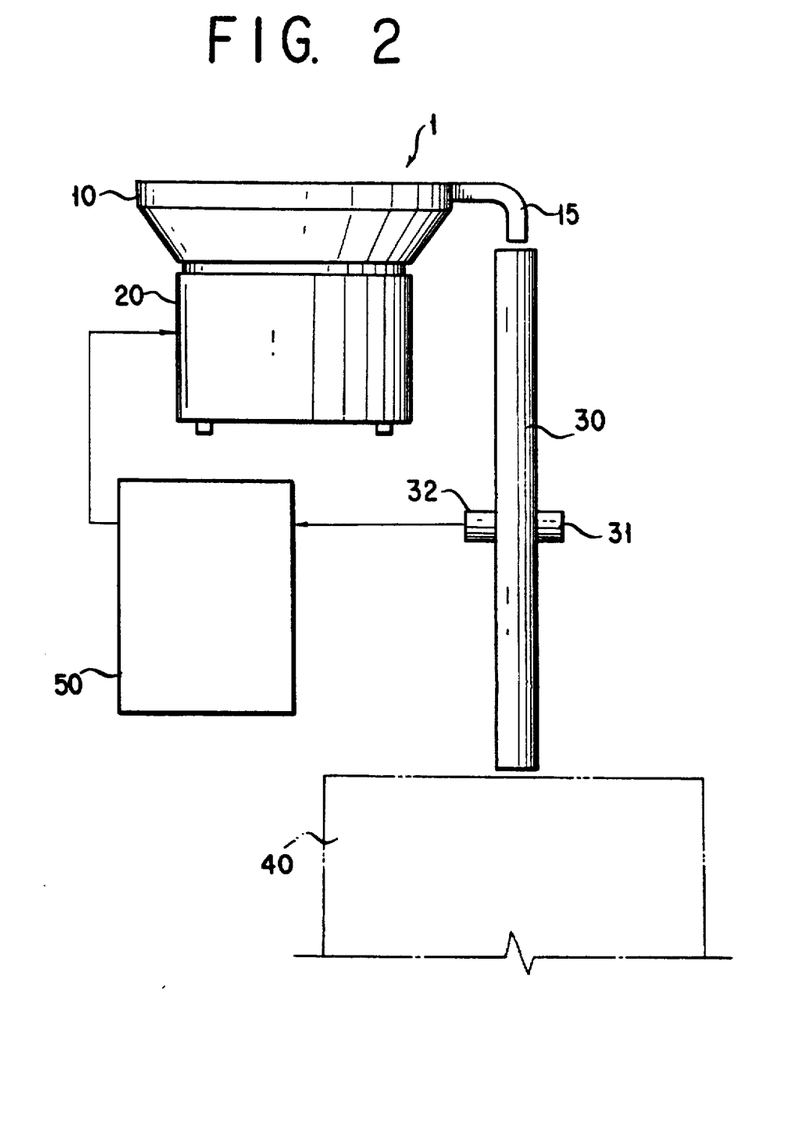
FIG. 2 is a schematic front view of a control system for a parts feeder according to a first embodiment of the present invention.

FIG. 2 shows a general schematic arrangement of a first embodiment of the control system for the parts feeder according to the present invention. The control system according to this embodiment comprises a parts feeder control unit 50 connected to a driving unit 20 for a parts feeder 1, and a light emitting element 31 and a photoelectric conversion element 32 both attached to a chute 30 which is a route for passage of parts and which is connected to but not in contact with a parts delivery section 15 of the parts feeder 1. The light emitting element 31 and the photoelectric conversion element 32 are fitted symmetrically in through-holes (not shown) formed on both sides of the chute 30 so that they can detect passage of the parts through the through-holes. Disposed above the driving unit 20 of the parts feeder 1 is a bowl 10 which serves as a vibrating unit for accommodating the parts and transmitting vibration to them for sending this out in turn, as shown in FIG. 1. The driving unit 20 has an electromagnet 27 mounted therein and is adapted to be excited by a driving electric current having a predetermined frequency supplied by the parts feeder control unit 50 so as to cause vibration of the bowl 10, as shown in FIG. 1. In the vicinity of an outlet of the chute 30, there is disposed an assembling machine 40 which assembles the parts sent thereinto through the chute 30 or processes the parts according to a predetermined program.

Figure 3:
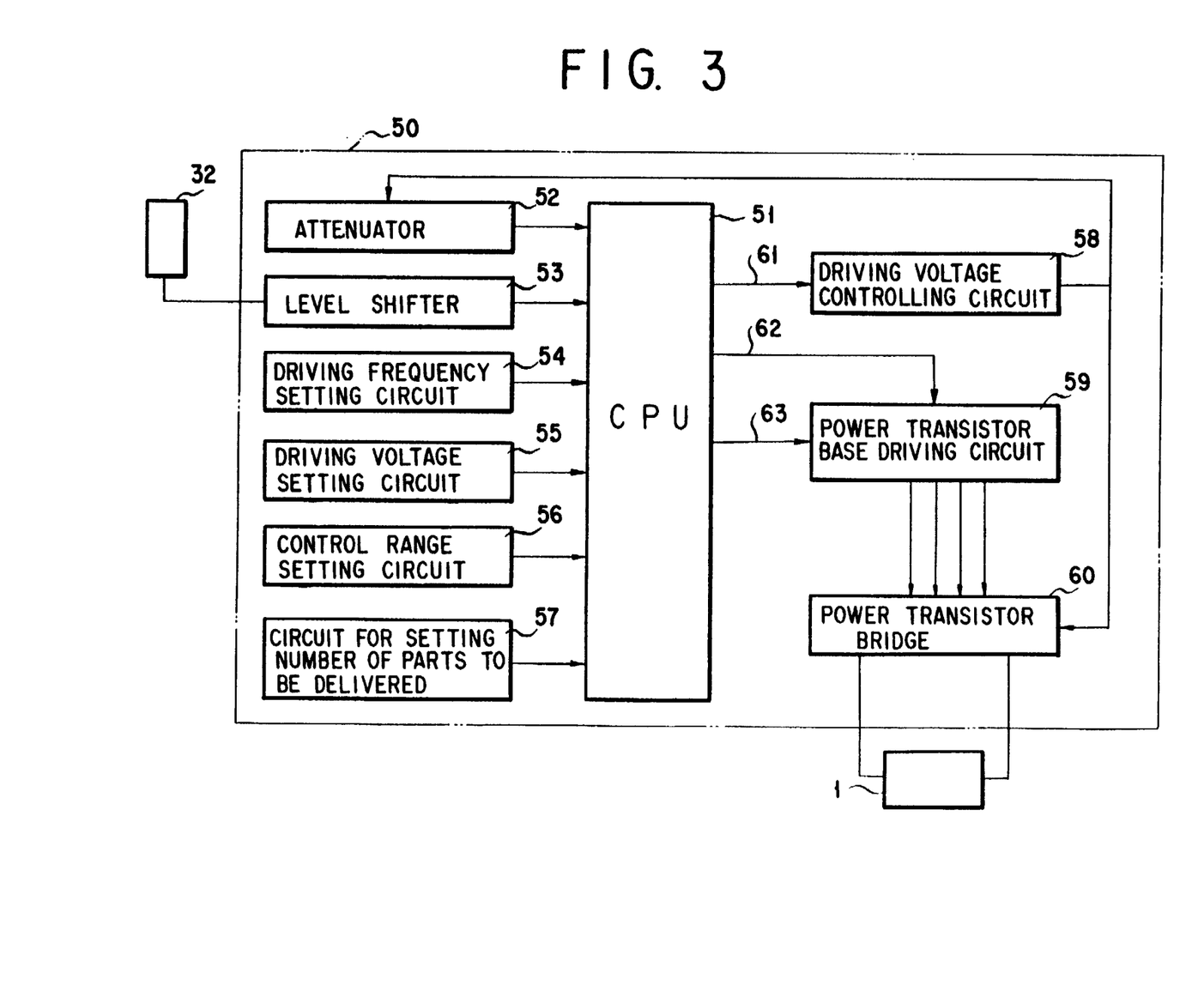
FIG. 3 is a block diagram of the control system for a parts feeder shown in FIG. 2.

The parts feeder control unit 50 comprises a CPU (central processing unit) 51 to which a memory device and input and output units, not shown, are connected and which conducts various kinds of control, as shown in FIG. 3. Connected to this CPU 51 are output terminals of an attenuator 52, a level shifter 53, a driving frequency setting circuit 54, a driving voltage setting circuit 55, a control range setting circuit 56 and a circuit 57 for setting the number of parts to be delivered, respectively. The CPU 51 has output terminals for control signals, which are connected to a driving voltage controlling circuit 58 and a power transistor base driving circuit 59, respectively, these circuits constituting a drive controlling means. The power transistor base driving circuit 59 has four output terminals connected to the bases of transistors of a power transistor bridge 60 which serves as a driving unit of the parts feeder 10.

The attenuator 52 serves to lower the output driving voltage of the driving voltage controlling circuit 58 to a digital signal level transmitted by the CPU 51 and inputs it to the latter. The level shifter 53 serves to lower the output voltage of the photoelectric conversion element 32 to the digital signal level and input it to the CPU 51. The driving frequency setting circuit 54, the driving voltage setting circuit 55, the control range setting circuit 56 and the circuit 57 for setting the number of parts to be delivered can be adjusted to their desired control values by means of their variable resistors, etc. not shown. The driving frequency setting circuit 54 serves to set a driving frequency of the bowl 10. The driving voltage setting circuit 55 serves to set the voltage to be supplied to the electromagnet 27 installed in the driving unit 20. The control range setting circuit 56 serves to set upper and lower limits for controlling the driving voltage. The circuit 57 for setting the number of parts to be delivered serves to preset the number of parts to be delivered by the bowl 10.

The driving voltage controlling circuit 58 receives a control signal or PWM signal 61 from the CPU 51 as an input thereof, and the output driving voltage of the driving voltage controlling circuit 58 is controlled by the pulse width of the PWM signal 61. This driving voltage is supplied to a power supply side of the power transistor bridge 60 as the voltage for driving the parts feeder 1. Further, the power transistor base driving circuit 59 receives a drive stopping signal 62 and a pulse signal 63 indicative of a driving frequency from the CPU 51, as inputs thereof. The power transistor base driving circuit 59 will control the output driving frequency of the power transistor bridge 60 in accordance with the pulse signal 63.

Next, the operation of the control system for the parts feeder according to this embodiment will be described below. The parts accommodated in the bowl 10 are sent through the parts delivery section 15 into the chute 30 while they are being vibrated by the vibratory motion of the bowl 10, and slip down through the chute 30 into the assembling machine 40. When slipping down through the chute 30, the parts pass in front of the photoelectric conversion element 32 and block the light emitted by the light emitting element 31 so that the photoelectric conversion element 32 outputs a signal current indicative of passage of each of the parts in response change in light received thereby. The signal current from the photoelectric conversion element 32 is transmitted through the level shifter 53 to the CPU 51 so that the number of parts which have passed through the chute 30 for a predetermined time may be counted by the CPU 51. Further, the CPU 51 will indicate the preset voltage to the driving voltage controlling circuit 58 by means of the PWM signal 61 so that the circuit 58 supplies a predetermined direct current voltage to the power transistor bridge 60. Simultaneously therewith, the CPU 51 will transmit the pulse signal indicative of a preset driving frequency to the power transistor base driving circuit 59 so that the circuit 59 renders the power transistor bridge 60 operative at the aforementioned preset driving frequency so as to generate an alternating current driving voltage converted from a direct current voltage supplied by the driving voltage controlling circuit 58. The electromagnet 27 of the parts feeder 1 is excited by the driving current supplied by the power transistor bridge 60, thereby vibrating the bowl 10 at the preset driving frequency. In this embodiment, the photoelectric conversion element 32 can detect not only the passage of the parts but also the overstock of the parts in the chute since, in case the parts supplied are stocked in the chute 30 up to the level corresponding to the position of the photoelectric conversion element 32, the light from the light emitting element 31 is blocked by the parts.

Figure 4:
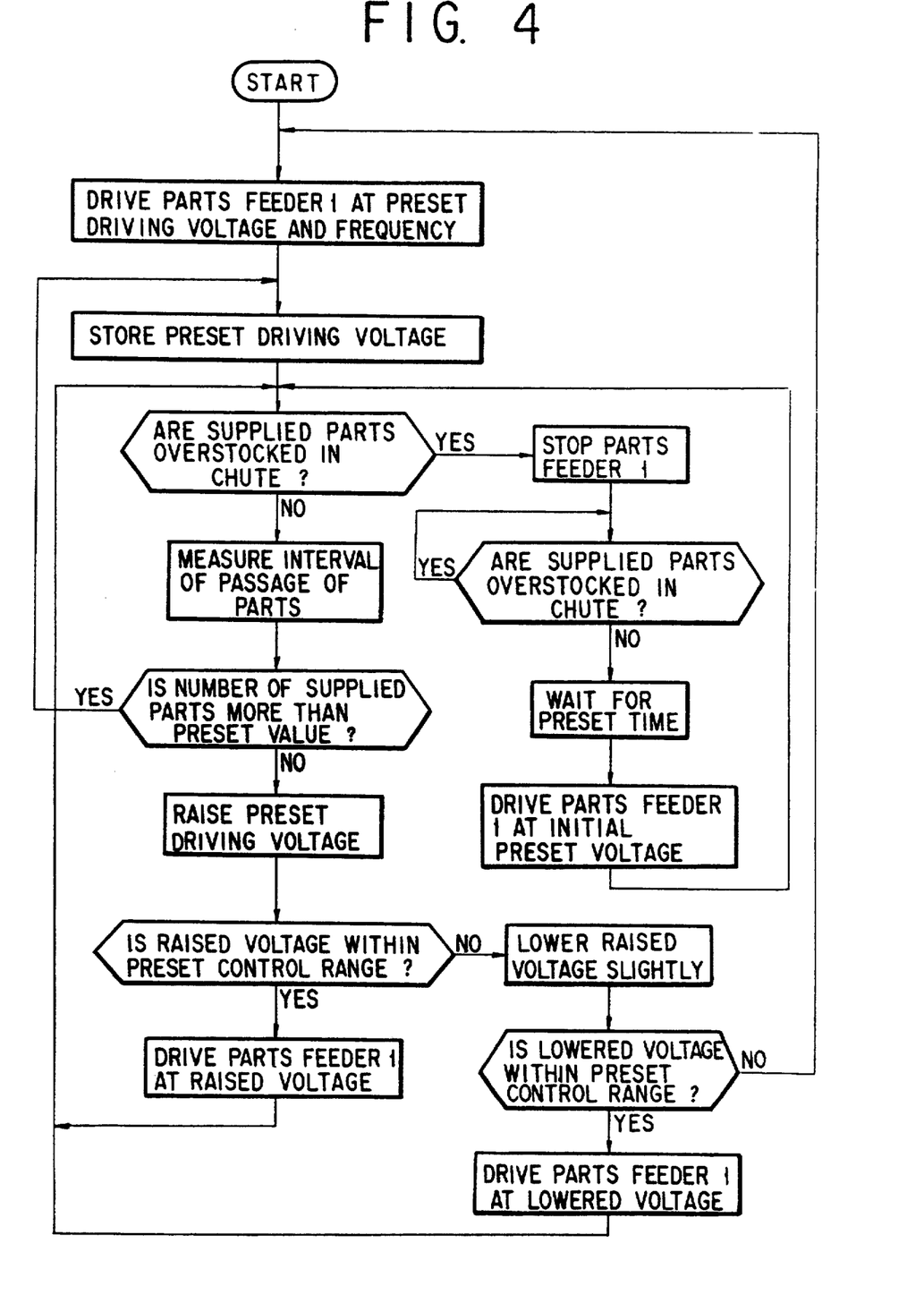
FIG. 4 is a flow chart showing the content controlled by the control system for a parts feeder shown in FIG. 2.

The control of the parts supply rate of the parts feeder by the control system according to this embodiment will be described below with reference to the flow chart shown in FIG. 4. First, the parts feeder 1 is driven at an initially set driving voltage which is once stored by the CPU 51 so that the parts feeder 1 may be driven at the stored driving voltage. Next, it is discriminated whether or not the supplied parts are overstocked in the chute 30. In case the parts are not overstocked in the chute, the interval of passage of the parts which have been detected by the photoelectric conversion element 32 is measured by the CPU 51 to discriminate whether or not the actual number of the parts supplied for a unit time, i.e. the rate of supply of the parts is more than the value initially set. In case the rate of supply of the parts is more than the preset value, the system is returned to conduct the above-mentioned driving voltage storage operation again, thereby repeating the above-mentioned routine. Whilst, in case the rate of supply of the parts is less than the preset value, the stored driving voltage mentioned above is raised somewhat, and it is discriminated whether or the raised driving voltage is within the range initially set. In case the raised driving voltage is within the preset range, the CPU 51 will command the driving voltage controlling circuit 58 to output the raised voltage. The raised output direct current voltage of the driving voltage controlling circuit 58 is converted by the power transistor bridge 60 into an alternating current driving voltage having an increased peak value, which is supplied to the driving unit 20 of the parts feeder 1 so that the latter is driven by this alternating driving current. In case the above-mentioned raised voltage is higher than the preset range, the voltage is lowered slightly, and it is discriminated again whether or not the lowered voltage is within the preset range. If the lowered voltage is within the preset range, then the voltage is supplied by the driving voltage controlling circuit 58 to the power transistor bridge 60 where it is converted into an alternating current driving voltage. The parts feeder 1 is driven by the alternating current supplied by the power transistor bridge 60. If the lowered voltage is not within the range initially set, then the voltage is reset to the initial preset value, and then the parts feeder is driven at the preset voltage and the above-mentioned procedure is conducted. When it has been discriminated that the parts are overstocked in the chute 30, the CPU 51 will transmit the drive stopping signal 62 to the power transistor base driving circuit 59 to stop the parts feeder 1, thereby interrupting the supply of the parts into the chute 30. The interrupting condition is kept until the upper level of the parts stocked in the chute 30 is reduced from a position slightly above the position of the photoelectric conversion element 32 to a position lower than the same. Thereafter, when the parts in the chute 30 are reduced to such a level as the parts are not overstocked in the chute, the parts feeder 1 is driven by the initial preset voltage after a predetermined waiting time.

According to the control system for the parts feeder according to this embodiment, since the rate of supply of the parts which is the number of parts delivered by the bowl 10 for a unit time is measured, the driving voltage controlling circuit 58 can be controlled so as to supply a desired number of parts accurately, irrespective of other external conditions, so that there is no need for stopping the operation of the assembling machine 40 due to the shortage in supply of parts, which enables the production efficiency to be improved significantly. Further, since the photoelectric conversion element 32 and the light emitting element 31 are attached to the chute 30 which is a separate member from the parts feeder 1 and therefore there is no fear of the vibration of the parts feeder 1 being directly transmitted to the elements 31 and 32, the accuracy of the measurement of the supply rate of the parts is high. Yet further, only the bowl 10 or the parts feeder 1 can be replaced easily. The photoelectric conversion element 32 and the light emitting element 31 serve for detection of the oversupply of the parts, too, and they can be formed in simple construction.

Figure 5:
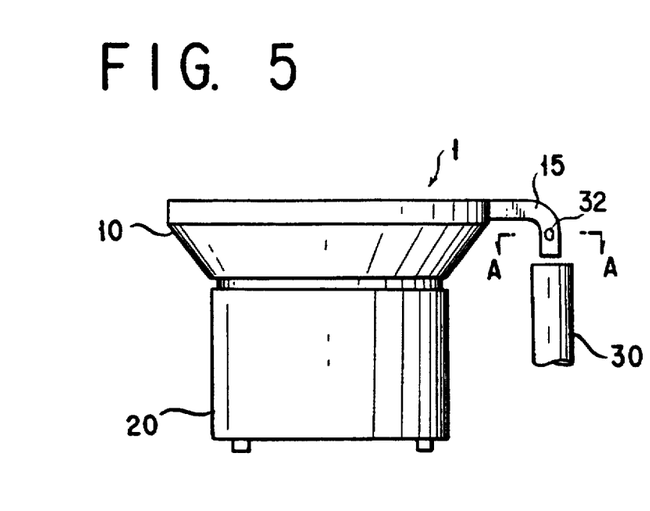
FIG. 5 is a schematic front view of a control system for a parts feeder according to a second embodiment of the present invention.
Figure 6:
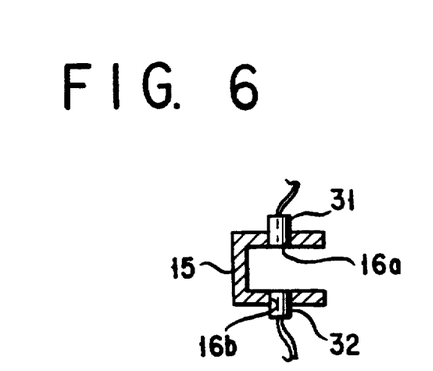
FIG. 6 is a sectional view of a parts delivery section taken along the line A—A in FIG. 5.

In the next place, a second embodiment of the system for the parts feeder according to the present invention will be described with reference to FIGS. 5 and 6. The components of this embodiment like those of the above-mentioned first embodiment are indicated by the same reference numerals, and description of them is omitted herein. In this embodiment, a light emitting element 31 and a photoelectric conversion element 32 are fitted in through-holes 16a and 16b formed in a parts delivery section 15.

The same function and effect as those of the above-mentioned first embodiment can be obtained by this embodiment. In this case, the photoelectric conversion element 32 and the light emitting element 31 may not be fixedly secured to the parts delivery section 15, and instead they may be installed at positions slightly spaced apart from the parts delivery section 15 so that passage of the parts may be detected through the through-holes 16a and 16b formed in the parts delivery section 15. By so doing, it is possible to prevent the vibration of the bowl 10 from transmitting to the above-mentioned elements 31 and 32 and avoid the adverse effect thereon.

According to the present invention, changes and modifications thereof can be made without departing from the spirit or essential characteristics thereof. For example, instead of the photoelectric conversion element and the light emitting element, a light switch may be provided in the path of the parts for detecting the passage of the parts. As a further alternative, a proximity sensor may be used to detect the passage of the parts. Further, the rate of supply of the parts may be determined by comparing the time interval of passage of the parts with a predetermined reference or by comparing the number of the parts passing through the chute for a unit time with a preset value. As for the content of the drive controlling means, it is possible to control not only the driving voltage but also the driving frequency, or alternatively both of them may be controlled. Still further, it is possible to conduct control such that the number of the parts to be delivered is always kept more than the required amount, without provision of the circuit for setting the number of parts to be delivered. The described embodiments are, therefore, to be considered in all respects as illustrative and not restrictive, the scope of the invention being indicated by the appended claims and all changes which come within the meaning and range of equivalency of the claims are, therefore, intended to be embraced therein.

What is claimed is:

1. A control system for controlling the feed rate of parts delivered by a parts feeder having a vibrating unit adapted to be vibrated with a predetermined amplitude for delivering parts and a driving unit for driving the vibrating unit, the system comprising:

drive controlling means for controlling said driving unit wherein said driving unit comprises an electromagnet located beneath said vibrating unit and a power transistor bridge for exciting said electromagnet;

parts detecting means for detecting the parts delivered by said vibrating unit; and means for controlling the feed rate of parts comprising a central processing unit which measures the rate of supply of the parts based on a signal transmitted by the detecting means and transmits at least one signal selected from among a signal for regulating the driving voltage and a signal for regulating the driving frequency to said drive controlling means in response to the rate of supply of the parts.

2. The control means of claim 1 wherein said parts detecting means is provided on the way of a passage of the parts which is a separate member from the vibrating unit.

3. The control system of claim 1 wherein said parts detecting means comprises a light emitting element provided on the way of a passage of the parts to be delivered by the parts feeder and adapted to emit light to the passage of the parts, and a photoelectric conversion element adapted to receive the light emitted by the light emitting element.

4. The control system of claim 2 wherein said parts detecting means is a limit switch.

5. The control system of claim 2 wherein said parts detecting means is a proximity sensor.

6. The control system of claim 1 wherein said central processing unit transmits a drive stopping signal to the drive controlling means when the central processing unit has received a signal indicative of oversupply of the parts from the parts detecting means.

7. The control system of claim 1 wherein said drive controlling means comprises a driving voltage controlling circuit for applying a predetermined direct current voltage to the power transistor bridge and a power transistor base driving circuit for causing the power transistor bridge to function at a predetermined driving frequency.

8. The control system of claim 1 further comprising:
   an attenuator adapted to receive the driving voltage supplied by the driving voltage controlling circuit, lower the voltage to a digital signal level, and transmit it to said central processing unit.

9. The control system of claim 1 further comprising:
   a level shifter adapted to receive a signal from the parts detecting means, lower the signal to a digital signal level and transmit it to said central processing unit.

10. The control system of claim 1 further comprising:
    a circuit for setting a driving frequency of said vibrating unit;
    a circuit for setting a voltage to be supplied to said driving unit;
    a control range setting circuit for regulating upper and lower limits of the driving voltage; and
    a circuit for presetting the number of parts delivered by the vibrating unit, the outputs of these circuits being transmitted to said central processing unit.

11. The control system of claim 1 wherein said vibrating unit is a bowl adapted to accommodate a large number of parts and provided with a side wall having a spiral passage formed on the inner peripheral surface thereof in the form of a gently upwardly sloping surface.

12. A control system for controlling the feed rate of parts delivered by a parts feeder having a vibrating unit adapted to accommodate a large number of parts and vibrated with a predetermined amplitude for delivering parts and an electromagnet disposed beneath said vibrating unit for vibrating said vibrating unit, comprising:
- a parts detector for detecting the parts delivered by said vibrating unit;
- a power transistor bridge for supplying an alternating driving electric current to said electromagnet to excite it;
- a driving voltage controlling circuit for applying a predetermined direct current voltage to the power transistor bridge;
- a power transistor base driving circuit for causing the power transistor bridge to function at a predetermined driving frequency;
- a central processing unit which measures the rate of supply of the parts based on a signal transmitted by the parts detector and transmits a signal for regulating the driving voltage to the driving voltage controlling circuit and a signal for regulating the driving frequency to the power transistor base driving circuit, in response to the rate of supply of the parts, and which further transmits a drive stopping signal to the power transistor base driving circuit when received a signal indicative of oversupply of the parts from the parts detector; and
- an attenuator adapted to receive the driving voltage supplied by the driving voltage controlling circuit, lower the voltage to a digital signal level, and transmit it to said central processing unit.

13. The control system of claim 12 wherein said parts detector comprises a light emitting element provided on the way of a passage of the parts to be delivered by the parts feeder and adapted to emit light to the passage of the parts, and a photoelectric conversion element adapted to receive the light emitted by the light emitting element.

14. The control system of claim 12 wherein the parts detector is a limit switch.

15. The control system of claim 12 wherein the parts detector is a proximity sensor.

16. The control system of claim 12 further comprising:
- a level shifter adapted to receive a signal from the parts detector, lower the signal to a digital signal level and transmit it to said central processing unit.

17. The control system of claim further comprising:
- a circuit for setting a driving frequency of said vibrating unit;
- a circuit for setting a voltage to be supplied to said electromagnet;
- a control range setting circuit for regulating upper and lower limits of the driving voltage; and
- a circuit for presetting the number of the parts delivered by the vibrating unit, the outputs of these circuits being transmitted to said central processing unit.

18. The control system of claim 12 wherein said vibrating unit is a bowl provided with a side wall having a spiral passage formed on the inner peripheral surface thereof in the form of a gently upwardly sloping surface.

19. A parts feeder comprising:
- a bowl provided with a side wall having a spiral passage formed on the inner peripheral surface thereof in the form of a gently upwardly sloping surface;
- an electromagnet disposed beneath the bowl for vibrating the bowl;
- a chute connected to a parts delivery section of the bowl; and
- a control unit connected to the electromagnet for controlling the feed rate of parts delivered by the bowl:
- the control unit comprising a parts detector associated with said chute for detecting the parts delivered by said bowl; a power transistor bridge for supplying an alternating driving electric current to said electromagnet to excite it; a driving voltage controlling circuit for applying a predetermined direct current voltage to the power transistor bridge; a power transistor base driving circuit for causing the power transistor bridge to function at a predetermined driving frequency; a central processing unit which measures the rate of supply of the parts based on a signal transmitted by the parts detector and transmits a signal for regulating the driving voltage to the driving voltage controlling circuit and a signal for regulating the driving frequency to the power transistor base driving circuit, in response to the rate of supply of the parts, and which further transmits a drive stopping signal to the power transistor base driving circuit when received a signal indicative of oversupply of the parts from the parts detector; and an attenuator adapted to receive the driving voltage supplied by the driving voltage controlling circuit, lower the voltage to a digital signal level, and transmit it to said central processing unit.

20. The parts feeder of claim 19 wherein said parts detector comprises a light emitting element adapted to emit light through the chute, and a photoelectric conversion element adapted to receive the light emitted by the light emitting element.

21. The parts feeder of claim 19 wherein said control unit further comprises a level shifter adapted to receive a signal from the parts detector, lower the signal to a digital signal level and transmit it to said central processing unit.

22. The parts feeder of claim 19 wherein said control unit further comprises:
- a circuit for setting a driving frequency of said bowl;
- a circuit for setting a voltage to be supplied to said electromagnet;
- a control range setting circuit for regulating upper and lower limits of the driving voltage; and
- a circuit for presetting the number of the parts delivered by the bowl, the outputs of these bowls being transmitted to said central processing unit.

23. A control system for controlling the feed rate of parts delivered by a parts feeder having a vibrating unit adapted to accommodate a large number of parts and vibrated with a predetermined amplitude for delivering parts and an electromagnet disposed beneath said vibrating unit for vibrating said vibrating unit, the control system comprising:
- parts detecting means for detecting the parts delivered by said parts feeder;
- a power transistor bridge for supplying an alternating driving electric current to said electromagnet to excite said electromagnet;

drive controlling means for causing the power transistor bridge to function at a predetermined driving frequency; and means for controlling the feed rate of parts adapted to measure the rate of supply of the parts detected by the parts detecting means, transmit a signal for regulating the driving frequency to said drive controlling means, in response to the rate of supply of the parts, so that said vibrating unit is vibrated with a predetermined amplitude, and further transmit a drive stopping signal to said drive controlling means when a signal is received indicative of oversupply of the parts from said parts detecting means.

24. The control system of claim 23 wherein said parts detecting means comprises a light emitting element provided on the way of a passage of the parts to be delivered by the parts feeder and adapted to emit light to the passage of the parts, and a photoelectric conversion element adapted to receive the light emitted by the light emitting element.

25. The control system of claim 23 wherein said means for controlling the feed rate of parts comprises a driving voltage controlling circuit for applying a predetermined direct current voltage to said power transistor bridge;

a central processing unit which measures the rate of supply of the parts based on a signal transmitted by said parts detecting means and transmits a signal for regulating the driving frequency or a drive stopping signal to said drive controlling means in response to the rate of supply of the parts; and an attenuator adapted to receive the driving voltage supplied by said driving voltage controlling circuit, lower the voltage to a digital signal level, and transmit it to said central processing unit.

* * * * *